United States Patent Office 3,185,696
Patented May 25, 1965

3,185,696
3',6'-DIAMINOFLUORAN DERIVATIVES
OF γ-LACTAM
Jack M. Tien, Tainan, Taiwan, China
(32 Willow St., Beacon, N.Y.)
No Drawing. Continuation of application Ser. No.
798,846, Mar. 12, 1959. This application Mar.
14, 1962, Ser. No. 179,787
14 Claims. (Cl. 260—295)

This invention relates to new and valuable compounds, their uses and their method of manufacture and more particularly it relates to new fused-lactam of the rhodamine series and is a continuation of my application Serial No. 798,846, filed March 12, 1959, now abandoned.

The novel compound which is useful as a coloring agent in its non-dye-color form, may be presented by the following formula:

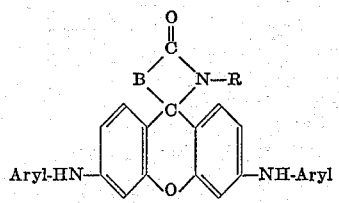

wherein B is an ortho divalent carbocyclic radical of the aromatic residue and R is a member chosen from the group consisting of hydrogen, alkyl, aryl, aroyl, pyridyl, pyrimidyl, pyrazinyl, acridinyl, quinolinyl, bis(4-dimethylaminophenyl)methyl, bis(4-methylamino - 3 - methylphenyl)methyl, NH-alkyl, NH-aryl and NH-acyl and these cyclic radicals may be substituted by a member of the group halogen, nitro, hydroxy, lower alkyl, lower alkoxy and cyano.

The following formulas are the examples of the novel compounds:

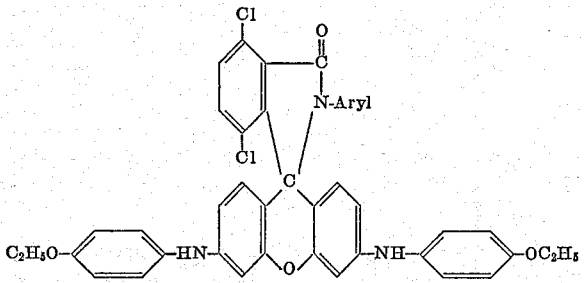

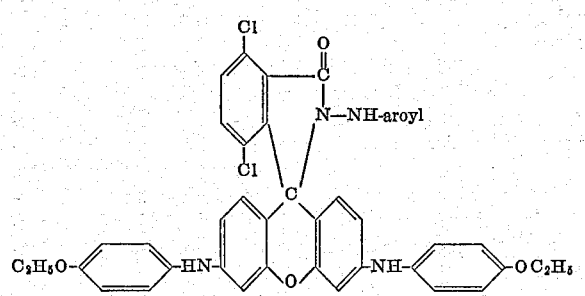

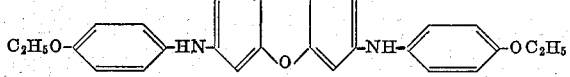

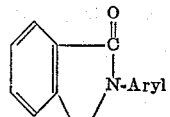

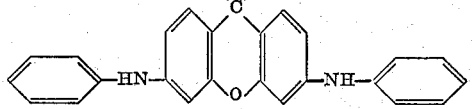

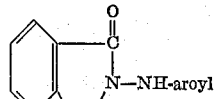

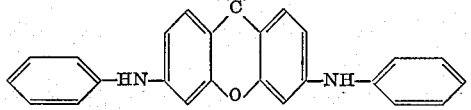

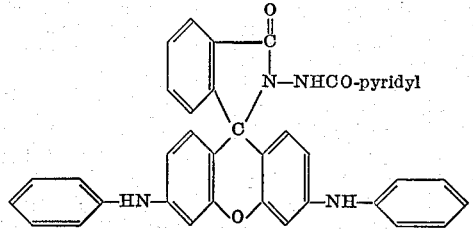

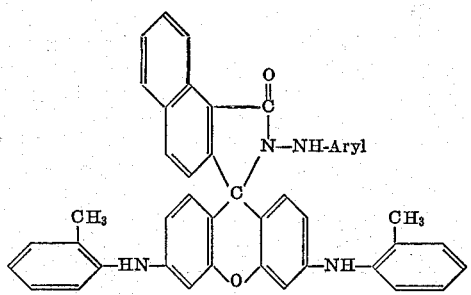

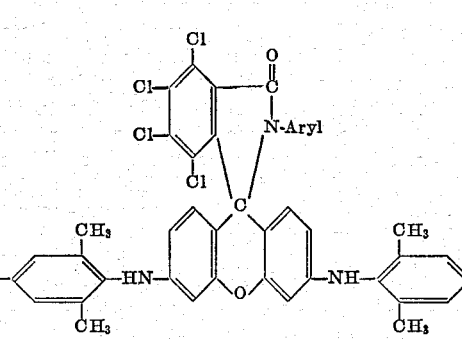

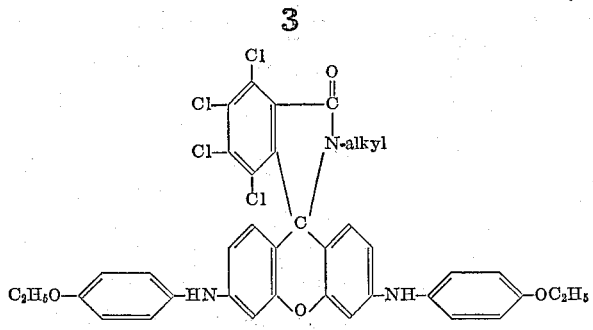

The method of producing the novel compounds is by condensation of a rhodamine with ammonia or its organic derivatives. The reaction may be presented by the following equation:

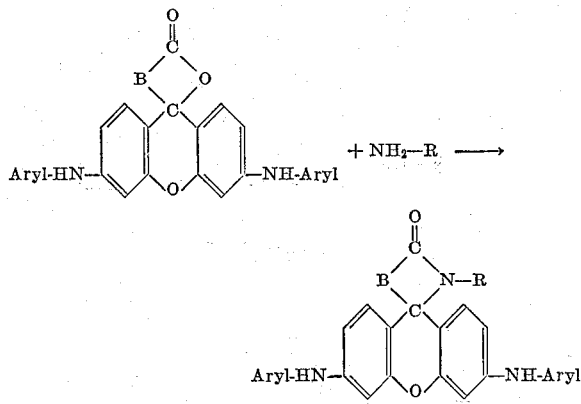

wherein B and R have the same meaning as defined herein above.

The condensation products of a polyethyl rhodamine base or its salt with ammonia or its organic derivatives are old. The use of ammonia and aniline or toluidine were disclosed in 1895 in German Patents 81,264 and 80,153 and the use of phenylhydrazine and nitroaniline were disclosed in 1896 in German Patents 85,242 and 88,675. In so far as I am aware that no one has produced any condensation products as defined in the first structural formula. These whole series of the new derivatives distinguish themselves from the conventional condensation products of rhodamine B and ammonia or its organic derivative by their unique thermochromic property, their different shade in color from their parent compound, their excellent light fastness and their far greater stability both to the atmosphere, and in storage.

A general process for preparing the new compounds of this invention involves condensing essentially equimolecular amounts of a rhodamine and ammonia or its primary organic derivative, or an excess of the latter, in presence or absence of a condensing agent, usually phosphorus oxychloride. It is advantageous in carrying out this condensation reaction by heating the reaction mixture to accelerate the production of the condensation product. Temperature which may be employed, ranges from 50° to 260°, mostly the reflux temperature of the reaction mixture. The latter will, of course, vary depending on the pressure, reactants and the specific solvents, if any, employed, usually a halogenated hydrocarbon such as chloroform, carbon tetrachloride, methylenehalide or an alcohol such as ethanol, isopropyl alcohol and 2-ethyl-butanol. The reaction time varies from one hour to 12 hours, depending on the temperature, the pressure and the starting materials employed. The new compounds of this invention are produced in substantially colorless or non-dye-color solids which are capable of producing dye color immediately upon intimate contact with a color initiator such as a clay, a zeolite, a phenol and/or a heteropolyacid.

The shades of the color range from pink, red, blue, purple to gray. Some of them in their normal state, namely nitro derivatives, are yellow or yellow-orange in color. Since this color is itself not a dye color, it is to be understood that the substantially colorless solids also include the yellow and the yellow-orange solids. It is also to be understood that the cyclic monovalent radicals such as aryl, pyridyl, pyrimidyl, pyrazinyl, quinolinyl, acridinyl, cycloparaffinyl and the like, as used above and elsewhere herein are to mean both unsubstituted and substituted radicals.

The suitable rhodamines which may be employed in this invention, include the following:

3′,6′-bis(anilino)fluoran
3′,6′-bis(anilino)-4,7-dichlorofluoran
3′,6′-bis(anilino)-4,5,6,7-tetrachlorofluoran
3′,6′-bis(4-cyclohexylanilino)fluoran
3′,6′-bis(4-ethoxyanilino)-4,7-dichlorofluoran
3′,6′-bis(4-ethoxyanilino)fluoran
3′,6′-bis(halopyrimidylamino)fluoran
3′,6′-bis(halopyridylamino)fluoran
3′,6′-bis(2-methylanilino)fluoran
3′,6′-bis(2-methyl-3-chloroanilino)fluoran
3′,6′-bis(methyl-pyridylamino)fluoran
3′,6′-bis(naphthylamino)fluoran
3′,6′-bis(pyridylamino)fluoran
3′,6′-bis(pyrimidylamino)fluoran
3′,6′-bis(2,4,6-trimethylanilino)fluoran Among the ammonia organic derivatives which may be employed, are in the following.

(1) Unsubstituted primary amines: Laurylamine, palmitylamine, mirsitylamine, stearylamine, aminopyridine, aminopyrimidine, aminopyrazine, aminoquinoline, 1-aminoisoquinoline, aniline, aminoacridine, aminobiphenyl, aminonaphthalene, aminophenanthridine cyclohexylamine, and aminoanthraquinone.

(2) Monosubstituted primary amines: Aminoacetanilide, aminoacetophenone, aminobenzonitrile, aminopicoline, aminophenol, 2-amino-nitropyridine, 2-amino-3-nitropyridine, anisidine, 2-chloro-5-aminopyridine, 5-chloro-2-aminopyridine, 2-ethoxy-5-aminopyridine, 2-hydroxy-5-aminopyridine, bromoaniline, nitroaniline, chloroaniline, chloronaphthylamine, nitronaphthylamine, phenetidine, and toluidine.

(3) Disubstituted primary amines: chlorotoluidine, chloronitroaniline, chloromethylaminopyridine, dichloroaminopyridine, 2,6-dihydroxy-4-aminopyridine, dihaloaniline, diethoxyaniline, dinitroaniline, methylanisidine, nitrotoluidine, 2,4,6-triaminopyridine, xylidine, 2-methoxy-5-nitroaniline, and 2-amino-4-nitrophenol.

(4) Trisubstituted primary amines: 2-amino-4-nitroaniline, 2-bromo-4,6-dinitroaniline, 6-chloro-3-nitro toluidine, 6-chloro-4-nitro-m-toluidine, 3,6-dibromo-4-nitroaniline, 3,5-dinitro-o-toluidine, tribromoaniline, trichloroaniline, and trimethylaniline.

(5) Polysubstituted primary amines: Tetrabromoaniline, tetrachloroaniline, pentabromoaniline and pentachloroaniline.

(6) Aliphatic acyl hydrazines: Lauroylhydrazine, palmitoylhydrazine, myristoylhydrazine and stearoylhydrazine.

(7) Aroyl hydrazines: Halogenated aroyl hydrazine, cyanoaroyl hydrazine, lower alkyl aroyl hydrazine, lower alkoxy aroyl hydrazine, hydroxyaroyl hydrazine, nitro-aroyl hydrazine, halo-nitro-aroyl hydrazine, halo-loweralkyl-aroyl hydrazine, halo-hydroxy-aroyl hydrazine, halo-loweralkoxy-aroyl hydrazine, halo-cyanoaroyl hydrazine, nitro-loweralkyl-aroyl hydrazine, nitro-loweralkoxy-aroyl hydrazine, and cyano-loweralkyl-aroyl hydrazine.

(8) Pyridine carbo hydrazines: Halogenated pyridine carbo hydrazine, lower alkyl pyridine carbo hydrazine, nitro-pyridine carbo hydrazine, pyridine carbo hydrazine, 2,6 - dihydroxy - 4 - pyridylcarbohydrazine, 2,6-dihalo-4-pyridylcarbo hydrazine, 2,6 - dihydroxy - 3,5 - dihalo - 4 - pyridylcarbo hydrazine and tetrachloro - 4 - pyridylcarbohydrazine.

(9) Phenylhydrazines: Phenylhydrazine, bromophenylhydrazine, chlorophenylhydrazine, ethylphenylhydrazine, methylphenylhydrazine, ethoxyphenylhydrazine, methoxyphenylhydrazine, dichlorophenylhydrazine, dibromophenylhydrazine, 2,4 - dimethylphenylhyrazine, 3 - chloro - 2-methylphenylhydrazine, 5 - chloro - 2 - methoxyphenylhydrazine, and 2,4,6-trimethylphenylhydrazine.

(10) Polycyclic aroyl and heteroaryl hydrazines: 1-chloro - 2 - naphthylhydrazine, 2 - hydrazinofluorene, 6-quinolylhydrazine.

The following examples will serve to illustrate the present invention without being limitative thereof:

*Example 1*

To a solution in chloroform of equimolecular amounts of 3',6'-bis(anilino)fluoran and chlorotoluidine is added, dropwise equivalent amount of phosphorus oxychloride. The mixture is then refluxed for 3 to 4 hours. After removal of volatile material under suction as completely as possible, the semisolid residue is dissolved in dilute hydrochloric acid, if necessary, with the aid of heat. The purplish crude product is precipitated out by adding sodium acetate, separated by filtration and washed with sufficient water to remove the inorganic salts. This is followed by washing with ethanol to remove any unreacted starting material. The latter process is repeated until the purplish color of the crude solid almost disappears. Recrystallization from hot benzene or a mixture of ethanol and benzene gives colorless crystals. The product has the formula:

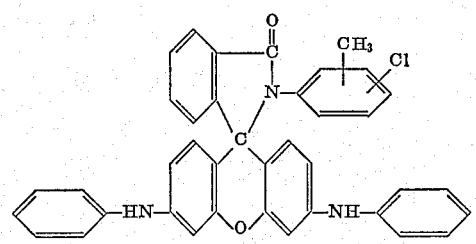

*Example 2*

The procedure of Example 1 is repeated in employing 3,4-dichloroaniline or a halogenated carbocyclic primary amine of the aryl series in lieu of the chlorotoluidine. The resulting product is a colorless solid and has the formula:

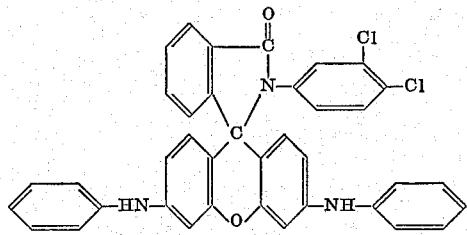

*Example 3*

The procedure of Example 1 is repeated in employing nitroaniline or a nitrated carbocyclic primary amine of the benzene series in lieu of the chlorotoluidine. The resulting product is a reddish yellow powdery solid and has the formula:

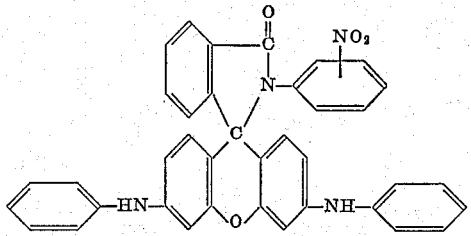

*Example 4*

The procedure of Example 1 is repeated in employing 3',6'-bis(2,4,6-trimethylanilino)fluoran and 2,4-dichloroaniline or a halogenated carbocyclic primary amine of the aroyl series in lieu of 3',6'-bis(anilino)fluoran and chlorotoluidine. The product is a colorless solid and has the formula:

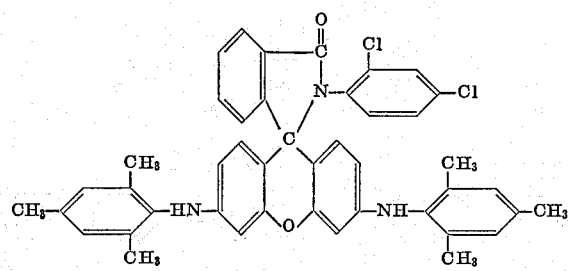

*Example 5*

The procedure of Example 1 is repeated in employing 3',6'-bis(2,4,6-trimethylanilino)fluoran and nitroaniline or a nitrated carbocyclic primary amine of the benzene series in lieu of 3',6'-bis(anilino)fluoran and chlorotoluidine respectively. The product is an orange-yellow solid and has the formula:

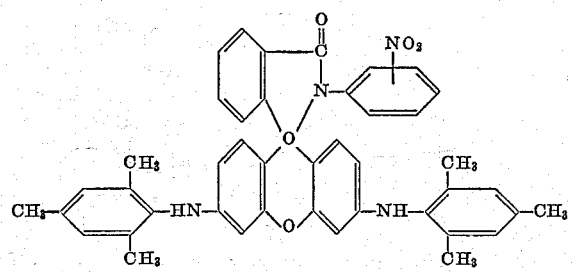

*Example 6*

A mixture of 3',6'-bis(anilino)dichlorofluoran and xylidine in 1:10 gram molecular weights is heated at 150° to 180° C. for five to six hours. The crude solid which is isolated with aid of acetic acid, is recrystallized from hot benzene. The product is produced as colorless solid and has the formula:

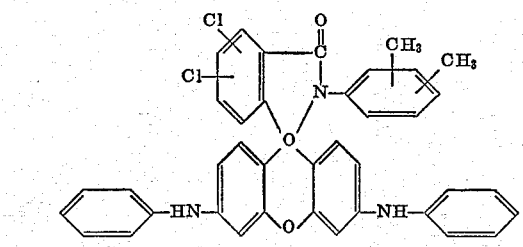

*Example 7*

The process of Example 6 is repeated in using 3',6'-bis(1-naphthylamino)fluoran and tolylhydrazine instead of 3',6'-bis(anilino)dichlorofluoran and xylidine respectively. The product is a white solid and has a formula:

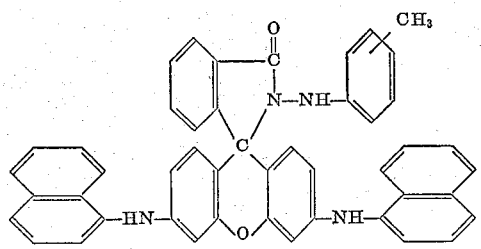

*Example 8*

The same process as in Example 6 is repeated in using 3',6'-bis(4-cyclohexylanilino)fluoran and 2-aminomethylpyridine instead of the starting material previously used in Example 6. The product is a colorless grainy solid and has the formula:

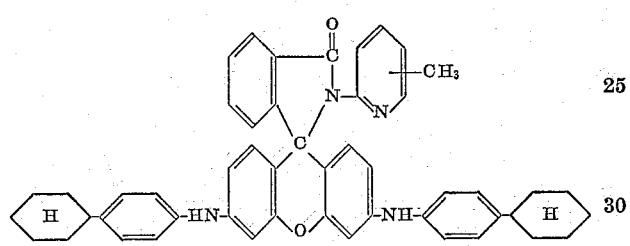

*Example 9*

The same process of Example 6 is repeated in using 3',6'-bis(3-chloro-2-methylanilino)fluoran and chloroaniline, instead of starting material previously used in the Example 6. The product is a white solid and has the formula:

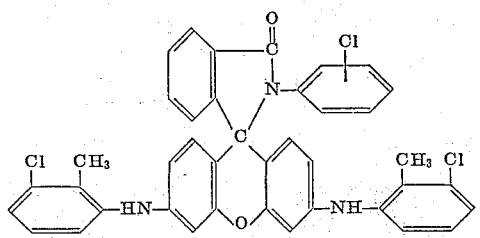

*Example 10*

An alcoholic solution of equimolecular amounts of 2,5-dichloroaniline and 3',6'-bis(4-ethoxyanilino)-4,7-dichlorofluoran or a halogenated carbocyclic primary amine of the aromatic series in a pressure vessel is slowly heated to about 170° C. and kept at this temperature for 6 to 7 hours. The colorless solid product isolated has the formula:

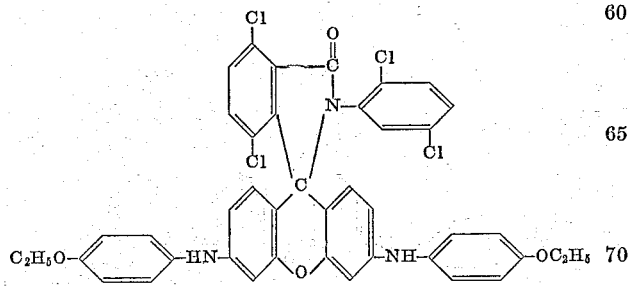

*Example 11*

The method of Example 10 is repeated by replacing 2,5-dichloroaniline with nitroaniline or a nitrated carbocyclic primary amine of the benzene series. The reddish yellow solid product has the formula:

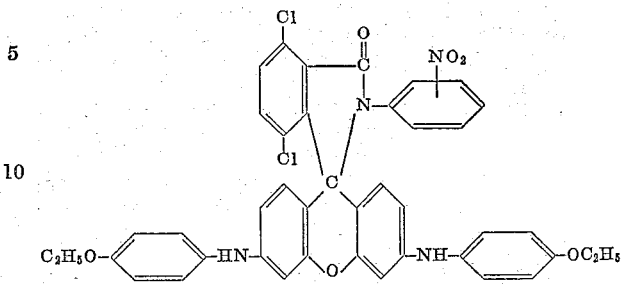

*Example 12*

The method of Example 10 is repeated by replacing 2,5-dichloroaniline with 2,4-dichlorobenzoylhydrazine or a hydrazide of the aromatic series. The colorless solid product has the formula:

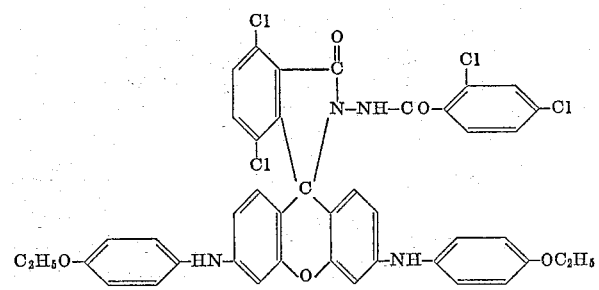

*Example 13*

The method of Example 10 is repeated in replacing 2,5-dichloroaniline with pyridine carboxylic acid hydrazide or 2,6-dichloro-4-pyridylcarbohydrazine. The white grain product for the former has the formula:

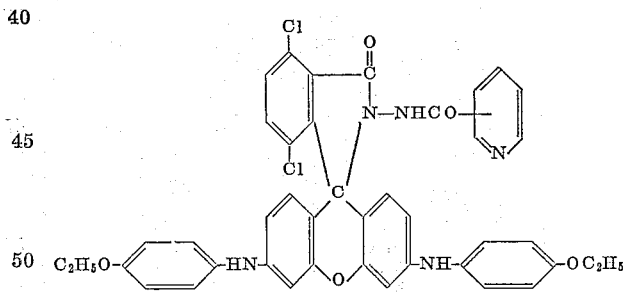

*Example 14*

The starting material of Example 10 is replaced by 3',6'-bis(4-ethoxyanilino)-4,5,6,7-tetrachlorofluoran and 3-aminoquinoline and the process is repeated. The resulting pale white solid product has the formula:

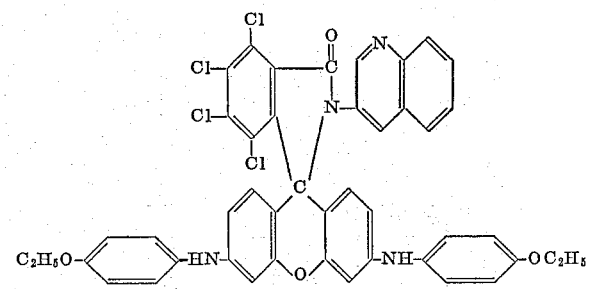

*Example 15*

A mixture in ethanol-chloroform of equimolecular amounts of 3',6'-bis(2-methylanilino)fluoran and bromoaniline is heated slowly to about 180° C. under pressure for 4 to 6 hours. The white solid isolated has the formula:

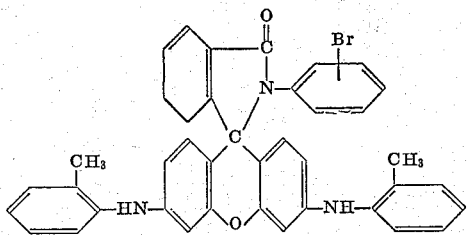

Example 16

The process of Example 15 is repeated in employing nitroaniline, or a nitrated primary amine of the benzene series in lieu of bromoaniline. The orange-yellow solid product isolated has the formula:

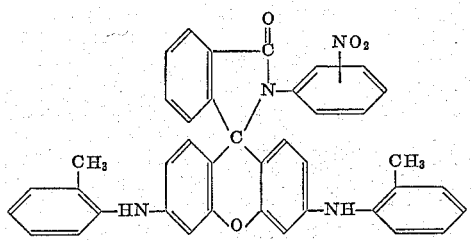

Example 17

The process of Example 15 is repeated in employing 3,4-dichlorobenzoylhydrazine or an acyl hydrazine of the aroyl series in lieu of bromoaniline. The white powder product isolated has the formula:

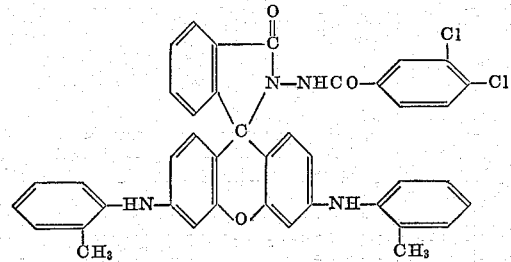

Example 18

An ethanol solution of 3',6'-bis(2,4,6-trimethylanilino)fluoran is saturated with ammonia gas at 0° C. under substantially anhydrous conditions, slowly heated to 160° to 180° C. and held at this temperature for 5-6 hours. Evaporation to dryness, the colorless crystals obtained from residue in hot ethanol has the formula:

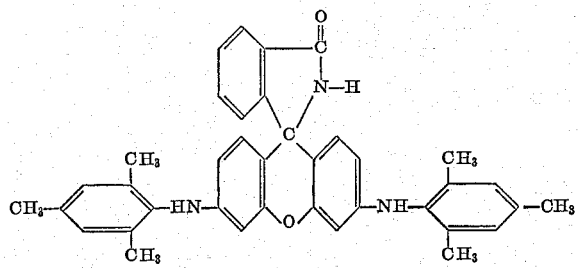

Example 19

A colorless fluid containing the compound of Example 10 in a chlorinated biphenyl liquid (trade name, Aroclor 1242) is applied on a foot or finger in the form of a thin film. As quickly as a surface bearing a zeolite or a clay is pressed against the foot or finger, a clear, vivid and intense blue image of the foot or finger print is duplicated on said surface. Yet no color develops on the foot or on the finger.

Example 20

The process of Example 19 is repeated on a surface carrying a hydrated aluminum silicate of a flexible and uniformly thick sheet material, in employing the compound of Example 17 in diethyl adipate instead of the compound of Example 10 in chlorinated biphenyl. There is no visible foot or finger print. However, the violet foot or finger print occurs immediately when the sheet is exposed to a radiation rich in infrared or merely by being placed in contact with a hot iron.

Example 21

A piece of white cotton or wool fabrics is impregnated with a benzene solution containing the compound of Example 12 and dried. On being dipped into a warm water bath containing phosphotungstic acid, the treated fabrics turn vivid blue instantaneously and permanently. Yet the water bath remains crystal clear and colorless.

Example 22

A pure white mixture of U.S.P. kaolin clay or propyl gallate and the condensation product of 3',6'-bis(4-ethoxyanilino)-4,7-dichlorofluoran and benzoic acid hydrazide is placed on a white index card in the form of a thin layer. On being pressed with a spatula, exposed to infra-red radiation or put on a hot iron, the mixture immediately and permanently becomes vivid blue.

Example 23

The condensation product of Example 13 is dissolved in dilute acetic acid at room temperature. The resulting solution is colorless. But it turns intense blue on being exposed to heat and becomes colorless again on cooling. The thermochromic property of this solution can be easily repeated.

What is claimed is:
1. A compound of the formula

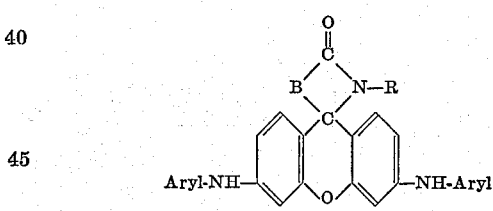

wherein B is a member selected from the group consisting of o-phenylene, halo-o-phenylene and o-naphthylene; Aryl is a member selected from the group consisting of cyclohexylphenyl, naphthyl and

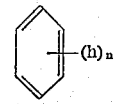

where $n$ is an integer from 1 to 4 and h is a member chosen from the group consisting of hydrogen, lower alkyl, hydroxy, lower alkoxy and halogen; R is a member selected from the group consisting of hydrogen, alkyl of from 1 to 18 carbon atoms,

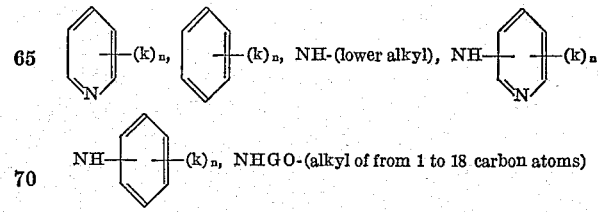

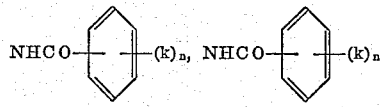

where k is a member selected from the group consisting of hydrogen, lower alkyl, hydroxy, lower alkoxy, nitro, halogen and cyano and $n$ is an integer from 1 to 4.

2. The compound of claim 1 in which B is dichloro-o-phenylene, Aryl is p-ethoxyphenyl and R is

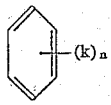

where k and $n$ have same meaning as defined above.

3. The compound of claim 1 in which B is dichloro-o-phenylene, Aryl is p-ethoxyphenyl and R is

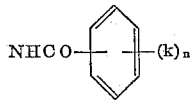

where k and $n$ have same meaning as defined above.

4. The compound of claim 1 in which B is o-phenylene, Aryl is phenyl and R is

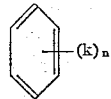

where k and $n$ have same meaning as defined above.

5. The compound of claim 1 in which B is o-phenylene, Aryl is phenyl and R is

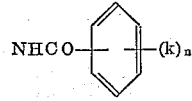

where k and $n$ have same meaning as defined above.

6. The compound of claim 1 in which B is o-phenylene, Aryl is methylphenyl and R is

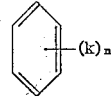

where k and $n$ have same meaning as defined above.

7. The compound of claim 1 in which B is o-phenylene, Aryl is methylphenyl and R is

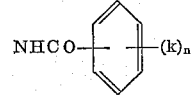

where k and $n$ have same meaning as defined above.

8. The compound of claim 1 in which B is o-phenylene, Aryl is 2,3,4-trimethylphenyl and R is

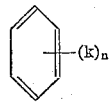

where k and $n$ have same meaning as defined above.

9. The compound of claim 1 in which B is o-phenylene, Aryl is 2,3,4-trimethylphenyl and R is

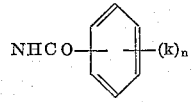

where k and $n$ have same meaning as defined above.

10. The compound of claim 1 in which B is o-phenylene, Aryl is phenyl and R is dichlorophenyl.

11. The compound of claim 1 in which B is o-phenylene, Aryl is ethoxyphenyl and R is nitrophenyl.

12. The compound of claim 1 in which B is dichloro-o-phenylene, Aryl is p-ethoxyphenyl and R is NHCO-pyridyl.

13. The compound of claim 1 in which B is o-phenylene, Aryl is phenyl and R is NHCO-dichlorophenyl.

14. The compound of claim 1 in which B is o-phenylene, Aryl is phenyl and R is

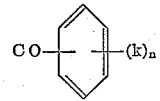

where k and $n$ have same meaning as defined above.

References Cited in the file of this patent

UNITED STATES PATENTS

| | | |
|---|---|---|
| 1,708,635 | Schoner et al. | Apr. 9, 1929 |
| 2,104,505 | Berthold | Jan. 4, 1938 |
| 2,576,293 | France et al. | Nov. 27, 1951 |

OTHER REFERENCES

Beilstein: Original Work, vol. 27 (1937), pp. 430–432.
Beilstein: Original Work, vol. 19 (1934), pp. 345–349.

IRVING MARCUS, *Primary Examiner.*
WALTER A. MODANCE, *Examiner.*